United States Patent
Ueno et al.

(10) Patent No.: US 9,293,958 B2
(45) Date of Patent: Mar. 22, 2016

(54) STATOR

(75) Inventors: Yasuhiro Ueno, Toyota (JP); Joji Yoshimura, Toyota (JP); Koji Nakanishi, Konan (JP); Shuichi Nakayama, Tajimi (JP); Hisayoshi Chiba, Anjo (JP); Naoki Yoshida, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 267 days.

(21) Appl. No.: 13/581,928

(22) PCT Filed: Mar. 4, 2010

(86) PCT No.: PCT/JP2010/053529
§ 371 (c)(1),
(2), (4) Date: Aug. 30, 2012

(87) PCT Pub. No.: WO2011/108098
PCT Pub. Date: Sep. 9, 2011

(65) Prior Publication Data
US 2012/0319507 A1    Dec. 20, 2012

(51) Int. Cl.
*H02K 3/34* (2006.01)
*H02K 3/32* (2006.01)

(52) U.S. Cl.
CPC ............... *H02K 3/325* (2013.01); *H02K 3/345* (2013.01)

(58) Field of Classification Search
CPC ......... H02K 5/08; H02K 3/345; H02K 3/487; H02K 3/44; H02K 3/522

USPC .................... 310/43, 214, 215, 194
See application file for complete search history.

(56) References Cited

U.S. PATENT DOCUMENTS

| | | | |
|---|---|---|---|
| 8,063,518 B2 | 11/2011 | Asai | |
| 8,075,825 B2 | 12/2011 | Takahashi et al. | |
| 2003/0098630 A1* | 5/2003 | Owada et al. | ................. 310/259 |
| 2005/0269891 A1 | 12/2005 | Shinoki et al. | |
| 2006/0145548 A1 | 7/2006 | Wakita | |
| 2009/0302694 A1 | 12/2009 | Asai | |
| 2010/0187918 A1* | 7/2010 | Takahashi et al. | ............... 310/43 |

FOREIGN PATENT DOCUMENTS

| | | |
|---|---|---|
| CN | 1745507 A | 3/2006 |
| CN | 101569079 A | 10/2009 |
| JP | 06-284620 A | 10/1994 |

(Continued)

OTHER PUBLICATIONS

Machine Translation, Arai et al., JP 2007244065 A, Sep. 20, 2007.*
(Continued)

*Primary Examiner* — Thomas Truong
(74) *Attorney, Agent, or Firm* — Kenyon & Kenyon LLP

(57) ABSTRACT

Disclosed is a stator capable of reducing stress generated in the resin mold of the stator. A stator is provided with a coil formed by coiling a flat conductor, a split stator core provided with a teeth unit for inserting the coil, and a resin mold, which has resin covering the coil ends of the coil inserted into the split stator core. In the stator, an insulator is formed between the split stator core and the coil by way of insert molding, and the resin mold has a cavity, formed in the radial direction of the stator, in between the coil and the end face of the split stator core.

9 Claims, 15 Drawing Sheets

(56) References Cited

FOREIGN PATENT DOCUMENTS

| JP | 07-016557 U | | 3/1995 | |
|----|----|----|----|----|
| JP | 10-234150 A | | 9/1998 | |
| JP | 2001-268834 A | | 9/2001 | |
| JP | 2002-084697 A | | 3/2002 | |
| JP | 2003-289010 A | | 10/2003 | |
| JP | 2005-261147 A | | 9/2005 | |
| JP | 2005-348553 A | | 12/2005 | |
| JP | 2006-217706 A | | 8/2006 | |
| JP | 2006-217707 A | | 8/2006 | |
| JP | 2007-215334 A | | 8/2007 | |
| JP | 2007244065 A | * | 9/2007 | |
| JP | 2008-113529 A | | 5/2008 | |
| JP | 2008-160938 A | | 7/2008 | |
| JP | 2008-199806 A | | 8/2008 | |
| JP | 2009-038918 A | | 2/2009 | |
| JP | 2009-072055 A | | 4/2009 | |
| JP | 2009201314 A | * | 9/2009 | |
| JP | 2009-261220 A | | 11/2009 | |
| WO | WO 2009025134 A1 | * | 2/2009 | H02K 1/14 |

OTHER PUBLICATIONS

Machine Translation, Maejima, JP 2009201314 A, Sep. 3, 2009.*
International Search Report of PCT/JP2010/053529 mailed May 25, 2010.

* cited by examiner

STATOR

CROSS-REFERENCE TO RELATED APPLICATIONS

This is a 371 national phase application of PCT/JP2010/053529 filed on Mar. 4, 2010, the entire contents of which are incorporated herein by reference.

FIELD OF THE INVENTION

The present invention relates to a technique to reduce the generation of inner stress caused in a resin molded part depending on a usage environmental when a stator having a coil end portion covered with resin by molding is used in a motor.

BACKGROUND OF THE INVENTION

Recently, there is an increasing demand for the use of a motor as drive power of a vehicle. When a motor is mounted in a vehicle to be used as drive power, coil end portions of a stator used in the motor are often protected with varnish or resin. Such protection using varnish or resin for the coil end portions of a stator core and coils ensures insulation in the coil end portions of the stator core and the coils. The motor mounted in a vehicle in an environment where it frequently subjected to vibrations. If the coils are displaced with respect to the stator core due to the vibrations, causing friction between the coils and the stator core, it may cause peeling of an insulating coating applied to protect the coils, an insulating material of an insulator and others. Therefore, the use of varnish and resin to protect the coil end portions is also intended to fix the coils to the stator core.

However, in the case of using varnish to protect the coil end portions of a stator, it takes long to drop varnish onto the coil end portions of the stator and harden the varnish. This is problematic in terms of cost reduction. Therefore, a method using resin to protect coil end portions of a stator has been studied. For using resin to protect coil end portions of a stator, for example, there is known a method using an insert molding or the like achieved by covering almost entire end faces of a stator core to form a resin molded part.

Patent Document 1 discloses a technique related to a stator structure of a rotating electrical machine. An insulator is mounted on a stator core and a coil is wound thereon, and then the coil end portions of the stator core are covered by resin molding. The shape of the insulator is designed so that all portions that contact with the resin molded part are obtuse when the coil end portions of the stator core are placed in contact with the resin molded portion. Such design of the shape of the insulator can avoid concentration of stress generated inside the resin.

The resin molded part covering the stator has an expansion coefficient different from those of resin, stator core, insulator, coil, and others. Accordingly, in a usage environment of the motor, the resin repeats heat shrinkage, causing inner stress, leading to the occurrence of cracks in a stress concentrated portion. This causes short circuits. To solve this problem, Patent Document 1 discloses a method of rounding off corners of the insulator.

Patent Document 2 discloses a technique related to interface insulating sheets and a motor. Each interface insulating sheet to be inserted between phases of coils in a stator is formed in an almost rectangular shape in which insulating portions are joined by connecting portions so that the connecting portions can be folded for free expansion and contraction, formed in a wave shape, or formed with fragile portions allowed to break off. Such a design of the connecting portions prevents positional displacement of insulating portions of the interface sheets.

Patent Document 3 discloses a technique related to a stator of a motor and a method of manufacturing a stator. An insulator is formed by insert-molding to be mounted on a stator core, a coil is wound thereon, and then a resin molded part is also formed with the same kind of resin. Since the insulator is provided on the stator core by insert molding, no gap is generated between the stator core and the insulator. As a result, the heat generated in the coil can be rapidly transferred to the stator core through the insulator, thus increasing a heat dissipation capability of a motor.

Patent Document 4 discloses a technique related to a split stator, a motor, and a method of manufacturing a split stator. This Patent Document 4 discloses, as with Patent Document 3, a split-type stator adopting the technique for forming an insulator by insert molding around a stator core, winding a coil, and then forming a resin molded part of the same kind of resin. This stator enhances a heat dissipation capability of a motor.

RELATED ART DOCUMENTS

Patent Documents

Patent Document 1: JP-A-2005-261147
Patent Document 2: JP-A-2006-217707
Patent Document 3: JP-A-2008-160938
Patent Document 4: JP-A-2009-072055

SUMMARY OF THE INVENTION

Problems to be Solved by the Invention

It is however conceivable that the techniques described in Patent Documents 1 to 4 have the following problems. When a flat conductor having a rectangular cross section is wound to form a coil, bent portions of the coil to be formed need a certain degree of bending radius. This is because the flat conductor has a predetermined cross-sectional area. In particular, an edgewise winding coil is effective in achieving high power of a motor. However, in the edgewise bending coil, a bent portion has a larger bending radius than in a case where a flat conductor is not edgewise bent. This generates a gap between each end face of a stator core and an inner circumferential surface of a coil. Especially, as the cross-sectional area of the flat rectangular cross section is increased to allow a larger amount of current to be supplied to the coil, the gaps between the coil and the stator core tend to become wider.

For the above reasons, when a stator is manufactured by the techniques disclosed in Patent Documents 1 to 4, a large amount of resin will flow in the gaps between the coil and the end faces of the stator core in resin-molding the coil ends of the stator. According to the cross-sectional area of the rectangular cross section of the flat conductor and the bending radius of each coil end portion, inner stress resulting from the heat accumulates inside the resin molded part during use of the motor. This generates cracks, which may break insulation between the coil and the stator core. A motor mounted in a vehicle generates heat during use but cools to an ambient temperature during non-use. Accordingly, in a usage environment, the resin molded part and the insulator of the stator are frequently subjected to thermal cyclic loads. Since the resin has an expansion coefficient different from those of the coil and the stator core, a shrinkage rate of the resin also increases as an amount of resin forming the resin molded part. As a result, stress accumulates in the resin of the stator in a usage environment of a motor and thus cracks may be generated.

The present invention has been made to solve the above problems and has a purpose to provide a stator and a stator manufacturing method, capable of reducing stress generated in a resin molded part or insulator of the stator.

Means of Solving the Problems

To achieve the above purpose, one aspect of the invention provides a stator configured as below.

(2) A stator including a coil formed by winding a conductor, a stator core provided with teeth on which the coil is mounted, and a resin molded part covering a coil end portion of the coil mounted on the stator core with resin, wherein an insulator is formed and provided by insert molding between the stator core and the coil, and wherein the resin molded part includes a cavity formed through in a radial direction of the stator core, the cavity serving as a stress relaxing section between the coil and an end face of the stator core to relax stress generated in the resin molded part caused by heat influence in a usage environment.

(3) In the stator (2), preferably, the insulator includes an end face wall covering the end face of the stator core, the end face wall is provided with a breakable portion.

(4) In the stator (2), preferably, the insulator is formed with a rib on an end face side of the stator core, the rib extending from a side wall covering a side surface of the teeth and along the end face of the stator core.

(5) In any one of the stators (2) to (4), preferably, the stator core consists of laminated electromagnetic steel sheets and one of the sheets located in the end face of the stator core has a teeth part having a width narrower than other sheets in a circumferential direction of the stator core.

(6) In the stator (5), preferably, the width of the teeth part in the circumferential direction of the stator core is narrower in a stepped manner toward the end face of the stator core.

(7) In any one of the stators (2) to (6), preferably, the insulator includes a pair of support walls supporting the coil, and the cavity is formed between the pair of support walls.

Effects of the Invention

The above configured stator of one aspect of the invention can provide the following operations and advantageous effects.

In the configuration of the invention described in (2), a stator includes a coil formed by winding a conductor, a stator core provided with a teeth on which the coil is mounted, and a resin molded part covering a coil end portion of the coil mounted on the stator core with resin, wherein an insulator is formed by insert molding between the stator core and the coil, and the resin molded part includes a cavity formed through in a radial direction of the stator core, the cavity serving as a stress relaxing section between the coil and an end face of the stator core to relax stress generated in the resin molded part caused by heat influence in a usage environment.

As mentioned in the Background section, when a coil is formed of a conductor having a large cross sectional area or a coil is made by edgewise bending, a large gap is likely to be generated between the end face of the stator core and the coil. In the case where the gap between the stator core end face and the coil is filled with resin, the resin shrinks or contracts toward the center of the gap. This leads to accumulation of inner stress in the resin molded part and the insulator in a usage environment of a motor. Researches by the applicant have revealed that the inner stress in the resin molded part tends to accumulate in corner portions of the end faces of the stator core, that is, in places corresponding to four corners of the insulator. Further, the inner stress accumulates in the four corners of the insulator itself. However, the stress relaxing section provided in the resin molded part or the insulator to relax stress can prevent the accumulation of the inner stress in the resin molded part or the insulator. This can restrain damages to the insulator or the resin molded part, resulting in a longer life of a product in a usage environment.

The cavity provided as the stress relaxing section in the resin molded part is formed to extend continuously in the radial direction of the stator core. Accordingly, the cavity formed in this way is arranged in the resin molded part to radially extend along the end face of the stator from an axis of the stator. Such a cavity formed in the resin molded part can achieve a reduction in amount of resin needed for the resin molded part. Further, the cavity can reduce a shrinkage amount of resin of the resin molded part. Consequently, it is possible to restrain the generation of inner stress accumulated in the insulator and the resin molded part, resulting in a longer life of a product in a usage environment.

The configuration of the invention described in (3), in the stator (2), the insulator includes an end face wall covering the end face of the stator core, the end face wall is provided with a breakable portion formed along the cavity to break the insulator. The breakable portion formed in the insulator is designed to have lower tension strength than other portions. Thus, if stress is generated in the resin molded part, the breakable portion is first to break off. In the stator, inner stress is generated due to heat influence in a usage environment based on a difference in heat shrinkage rate between the stator core and the resin molded part and between the resin forming the insulator and the coil as mentioned above. This inner stress may affect insulation between the coil and the stator core. Therefore, the breakable portion is provided in the radial direction of the stator core to intersect with a direction in which many forces are generated when the insulator thermally shrinks or contracts.

The breakable portion is provided on the end face side of the stator core and in the radial direction of the stator core, so that the breakable portion is positively broken off upon generation of stress. When the insulator is broken or split at the breakable portion, the stress generated due to heat influence in a usage environment is blocked from transmitting. In other words, a portion that does not contribute to insulation is caused to positively break off and hence the stress is prevented from transmitting to a portion needing to keep insulation performance.

The configuration of the invention described in (4), in the stator (2), the insulator is formed with a rib on an end face side of the stator core, the rib extending from a side wall covering a side surface of the teeth along the end face of the stator core.

The insulator is provided with the side wall covering the side surface of the teeth and the rib partially covering the end face side of the teeth. Accordingly, the insulator is discontinuously formed on the end face side of the teeth. Therefore, this configuration provides the same condition as a state where the breakable portion of the invention (3) is broken off. Even when the resin molded part thermally shrinks in a usage environment of a motor, the discontinuous portion blocks transmission of stress, thereby dispersing shrinkage force of the resin. Consequently, it is possible to prevent stress from concentrating in a portion of the resin molded part or insulator needing to keep insulation.

The configuration of the invention described in (5), in the stator described in one of (2) to (4), the stator core consists of laminated electromagnetic steel sheets and one of the sheets located in the end face of the stator core has a teeth part having a width narrower than other sheets in a circumferential direction of the stator core.

Since the width of the teeth part of the electromagnetic steel sheet placed in the end face of the stator core is designed to be narrower than others in the circumferential direction of the stator core, the stress concentrated in the insulator formed to cover the teeth part of the stator core can be dispersed. In addition, the resin molded part has the cavity and thus higher effects can be achieved than the stator described in (2). This makes it possible to prevent damages to the insulator and the resin molded part in a usage environment of a motor to keep insulation between the coil and the stator core.

The configuration of the invention described in (6), in the stator (5), the width of the teeth part in the circumferential direction of the stator core is narrower in a stepped manner toward the end face of the stator core.

With the corners of the teeth part of the stator core formed stepwise, higher effect of dispersing stress concentration can be achieved than the stator described in (5). This can prevent damages to the aforementioned insulator and resin molded part, thereby keeping insulation between the coil and the stator core.

The configuration of the invention described in (7), in the stator described in one of (2) to (6), the insulator includes a pair of support walls supporting the coil, and the cavity is formed between the pair of support walls.
A result of stress analysis conducted by the applicants shows that a model including a cavity entirely formed provides a highest effect of stress reduction. The effect is lower in turn by a model having a thicker thickness under the cavity, and a model provided with an elliptic cavity. Accordingly, the configuration of the insulator is provided with the support walls and the cavity is formed between the pair of support walls can provide a higher effect of stress reduction.

DETAILED DESCRIPTION

A detailed description of a preferred first embodiment of the present invention will now be given referring to the accompanying drawings.

First Embodiment

Figure 1:
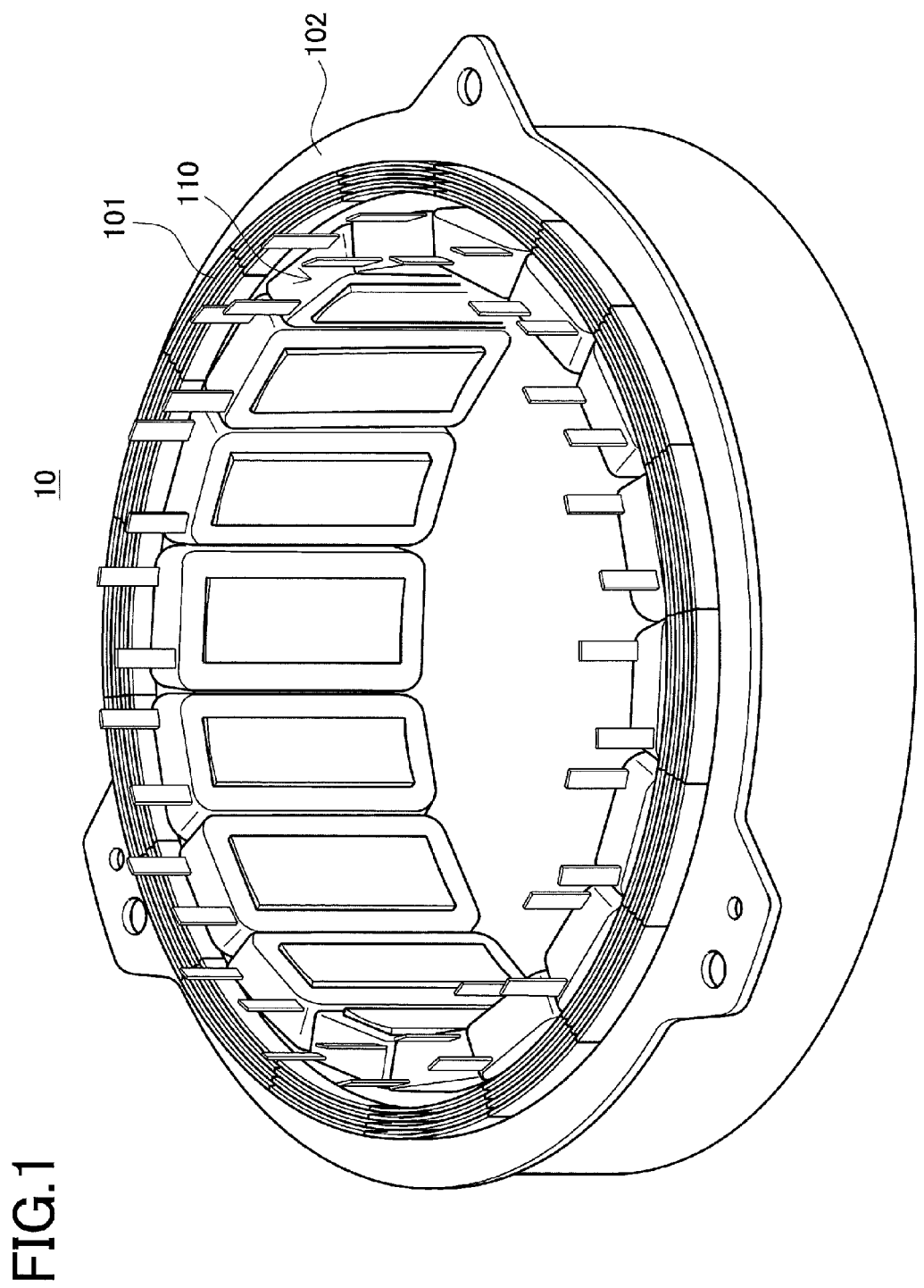
FIG. 1 is a perspective view of a stator in a first embodiment.
Figure 2:
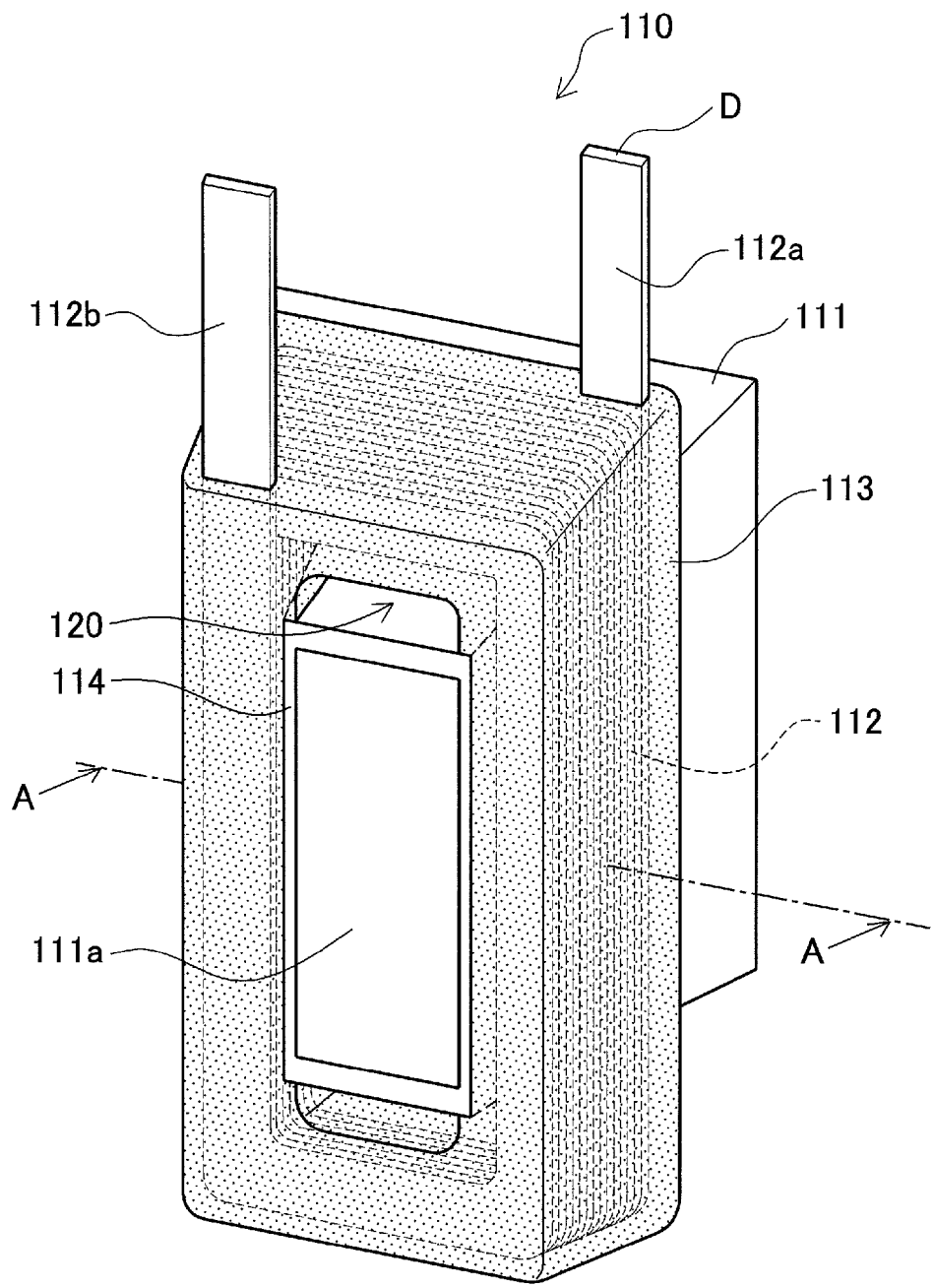
FIG. 2 is a perspective view of a stator segment unit in the first embodiment.

FIG. 1 is a perspective view of a stator in the first embodiment. FIG. 2 is a perspective view of a stator segment unit. A stator 10 is a split-type stator core including eighteen stator segment units 110 shown in FIG. 2 arranged in an annular form, forming the stator. Each stator segment unit 110 includes a core piece (a split-type stator core) 111, a coil 112 formed of a flat conductor D having a rectangular cross section wound by edgewise bending, a resin molded part 113, and an insulator 114. Further, the stator 10 has, on a coil end, a bus bar holder 101. An outer ring 102 is fitted or mounted on the outer periphery of the stator segment units 110.

Each core piece 111 is formed of electromagnetic steel sheets each made by press work or the like and laminated one on another, and includes a teeth part 111a protruding from an inner periphery side. The coil 112 is formed of the flat conductor D by edgewise bending and includes an outside terminal portion 112a and an inside terminal portion 112b on a coil end side. The flat conductor D is a wire made of metal having high electric conductivity such as copper and having a rectangular cross section, and coated with insulating resin such as enamel. The insulator 114 is formed on the core piece 111 by insert molding. The coil 112 is mounted on the insulator 114, and then the resin molded part 113 is formed by insert molding conducted again. For a process of forming the insulator 114 and the resin molded part 113, refer to JP 2009-72055A of an application filed by the present applicants, and others.

The resin molded part 113 and the insulator 114 are made of thermoplastic resin such as PPS resin. Since the insulator 114 is formed on the core piece 111 by insert molding, adhesion strength between the core piece 111 and the insulator 114 can be enhanced. The insulator 114 includes side walls 114a covering the side surfaces of the teeth part 111a of the core piece 111 and end-face walls 114b covering the end faces of the teeth part 111a. Support walls 114c for supporting the coil 112 are provided on both side edges of each end-face wall 114b.

Figure 3:
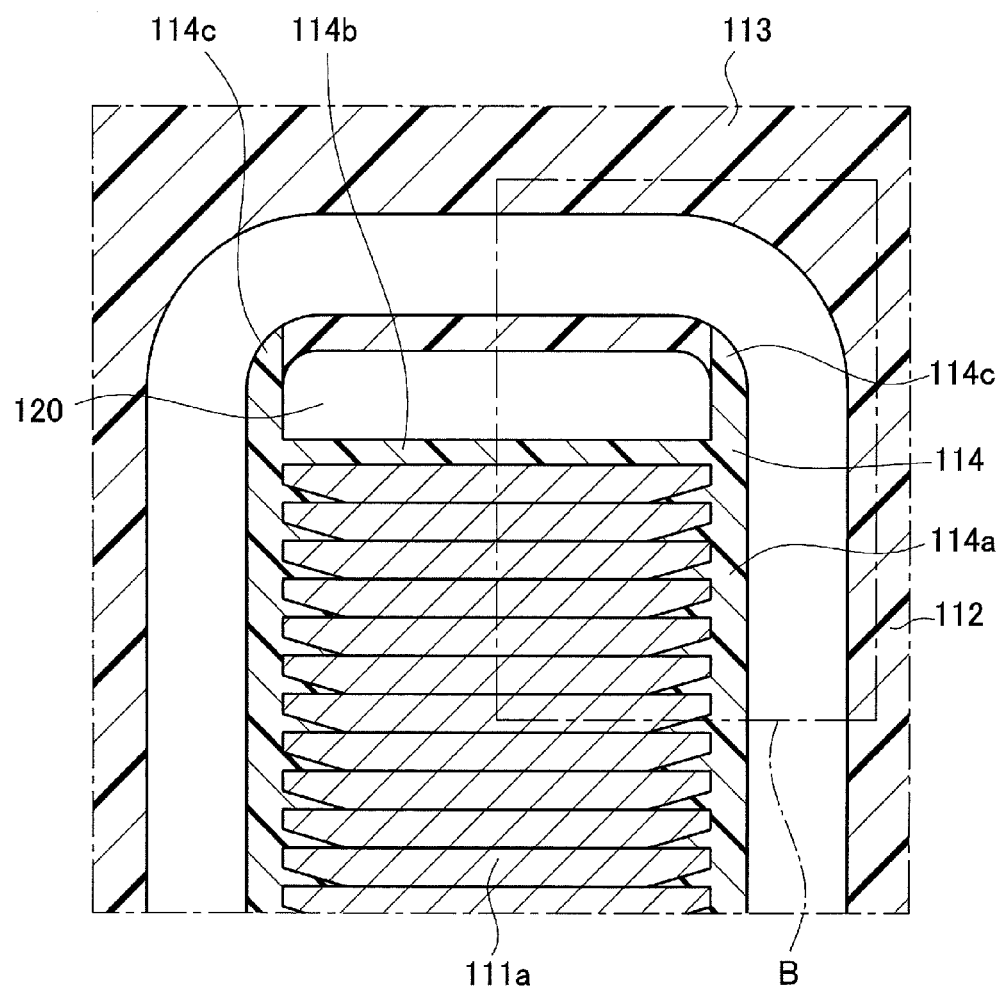
FIG. 3 is a front sectional view of a part of the stator segment unit in the first embodiment.

FIG. 3 is a front cross-sectional view of a part of the stator segment unit. In this figure, the thickness of the laminated steel sheets of the teeth part 111a is illustrated to be thick for easy viewing. This figure shows a part of an A-A cross section in FIG. 2. On the end face of the teeth part 111a, the support walls 114c supporting the coil 112 are provided on both side edges of the end-face wall 114b. A cavity 120 serving as a stress relaxing section is formed between the walls 114c. The cavity 120 is formed by a protrusion of a molding die protruding from a side corresponding to an outer or inner periphery of the core piece 111 when the resin molded part 113 is formed. The cavity 120 is therefore formed to extend through the stator segment unit 110 from an inner periphery side to an outer periphery side. Since the cavity 120 is formed on each end face of the core piece 111, even though not illustrated, two cavities 120 are formed in each stator segment unit 110.

Each cavity 120 formed as above is preferably designed so that a portion of the resin molded part 113 located inside a coil 112 is as thin as possible. However, by the action of insert molding, excess thickness of the resin forming the resin molded part 113 is caused on the inside of the coil 112, on the upper surface of the end-face wall 114b, and others. Accordingly, the material thickness is preferably formed as thin as possible.

The stator 10 of the first embodiment being configured as above can provide the following operations and advantageous effects. Firstly, by the cavity 120 provided in the resin molded part 113, it is possible to release or relax stress concentration in the resin molded part 113. The stator 10 of the first embodiment includes the coil 112 formed of the wound flat conductor D, the core piece 111 including the teeth part 111a on which the coil 112 is mounted, and the resin molded part 113 made in such a manner that the coil end portions of the coil 112 mounted on the core piece 111 are covered with resin. The insulator 114 is formed by insert molding between the core piece 111 and the coil 112. The resin molded part 113 is provided with the cavities 120 each formed to continuously extend in a radial direction of the stator 10 between the coil 112 and the core piece 111.

Figure 4:
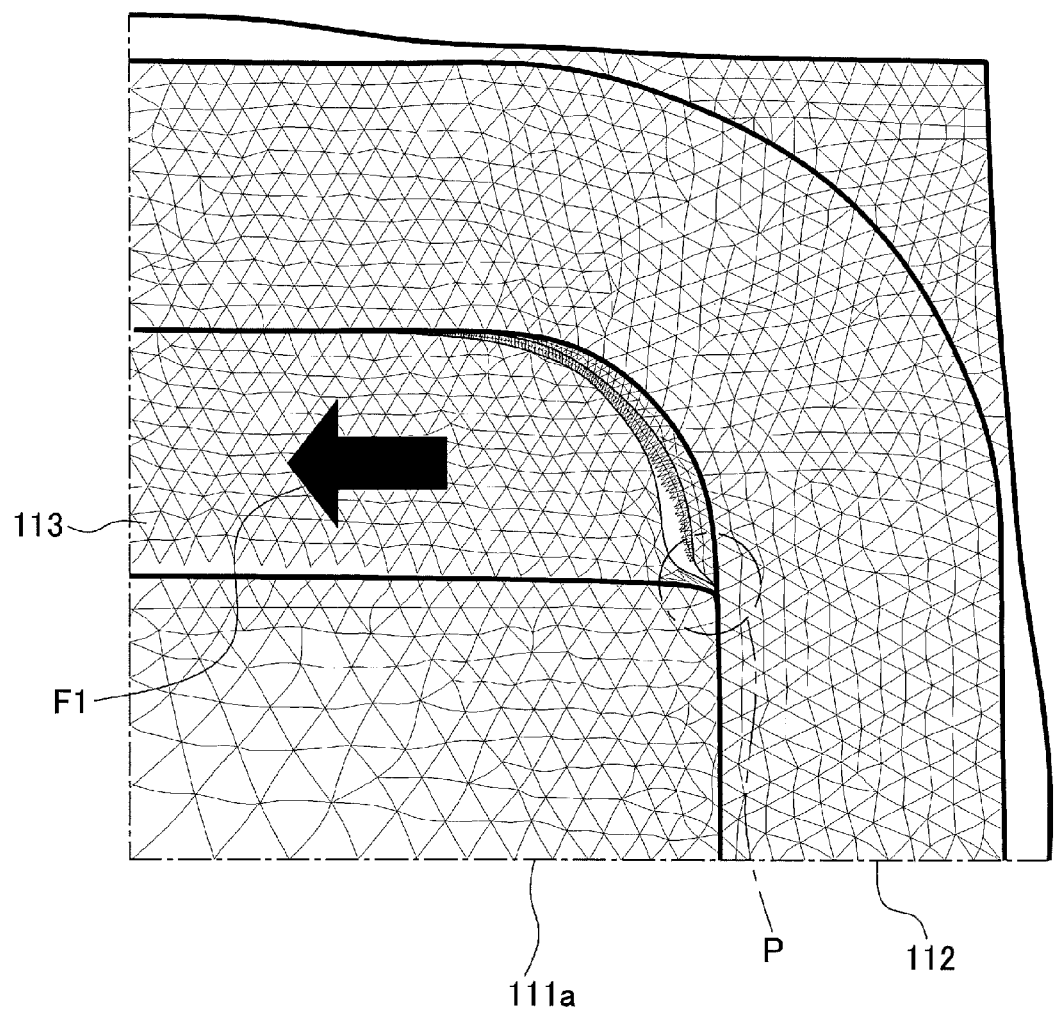
FIG. 4 is a schematic diagram showing a stress analysis result of a coil end provided with no cavity in a resin molded part in a comparative example.

FIG. 4 is a schematic diagram showing a stress analysis result of a coil end in which a cavity is not provided, illustrating a part corresponding to FIG. 3. Since the resin molded part and the insulator are made of the same kind of resin, they are illustrated integrally for convenience of analysis. In the case of the stator 10 not provided with the cavity 120 in the resin molded part 113, as shown in FIG. 4, it is found that stress concentrates on a stress concentration area P. To be concrete, when thermal cyclic loads are exerted on a cross-sectional model of the stator 10, a shrinkage force F1 acts on the resin molded part 113, causing stress to concentrate in the stress concentration area P. Since the linear expansion coefficients of the resin molded part 113 and the insulator 114 are larger than the linear expansion coefficients of the coil 112 and the teeth part 111a, the resin molded part 113 and the insulator 114 have a high heat shrinkage rate, and a force induces the resin to shrink or contract toward the center of the resin molded part 113, i.e., leftward in the figure. Further, a force induces the resin molded part 113 to separate or peel from the coil 112.

Due to the generation of such shrinkage force F1, stress concentrates and accumulates in the stress concentration area P. This may cause cracks in the resin molded part 113 or the insulator 114, thereby causing insulation failures between the coil 112 and the teeth part 111a. However, such a shrinkage force F1 is relaxed or reduced by the cavity 120 formed in the resin molded part 130. This results from the reasons that the volume of resin forming the resin molded part 113 is reduced and thus a shrinkage amount of the resin decreases and also that the cavity 120 blocks transmission of the shrinkage force F1.

Figure 5:
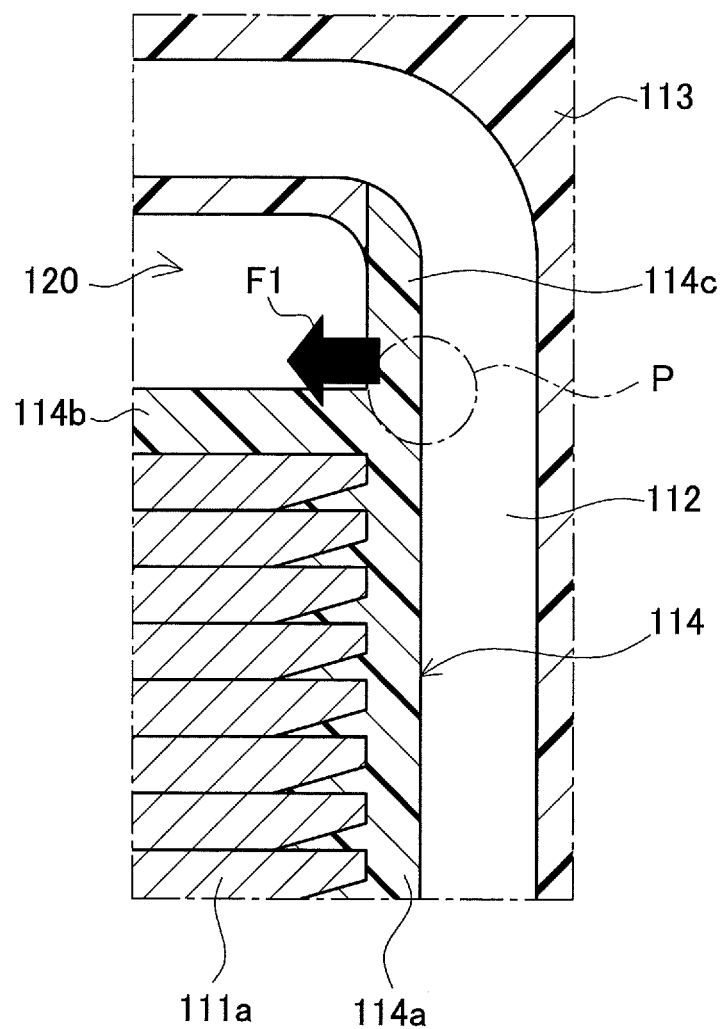
FIG. 5 is a schematic cross-sectional view of a stator core end portion provided with a cavity in a resin molded part in a comparative example.

FIG. 5 is a schematic cross-sectional view of an end portion of the stator core provided with the cavity, corresponding to a part B in FIG. 3. In the coil end of the stator segment unit 110 of the stator 10, the cavity 120 is provided. Because of this, the resin shrinks or contracts by an amount corresponding to the shrinkage of the insulator 114, so that the shrinkage force F1 is smaller by a reduced amount of resin which shrinks as compared with the case shown in FIG. 4. This also diminishes stress concentration in the stress concentration area P.

Figure 6:
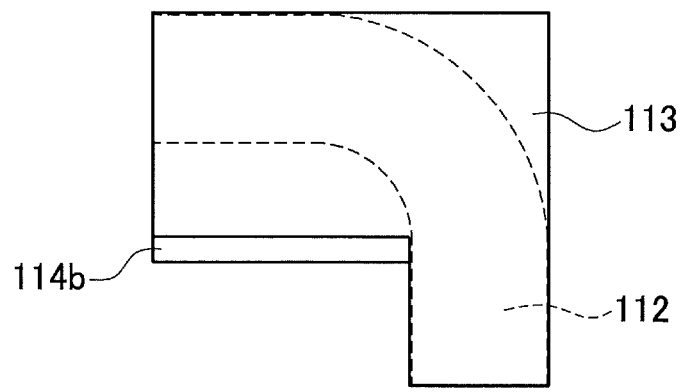
FIG. 6 is a model of a stator formed with no cavity in a comparative example.
Figure 7:
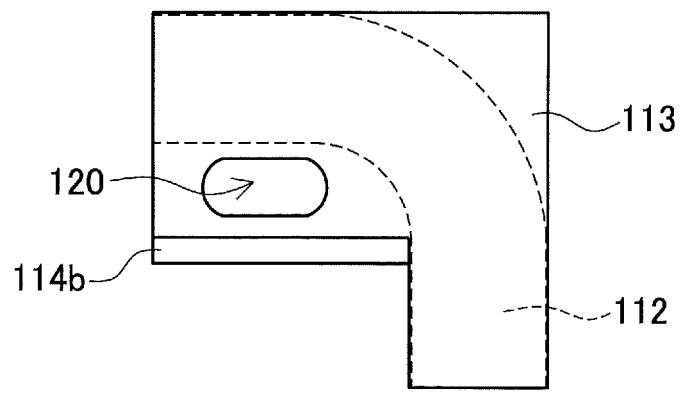
FIG. 7 is a model formed with an elliptic cutout in a comparative example.
Figure 8:
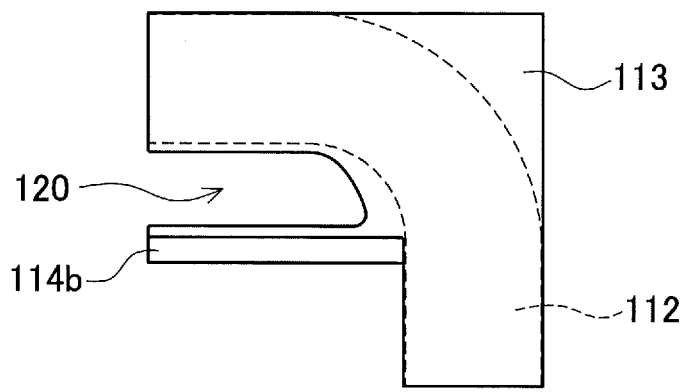
FIG. 8 is a model formed with a cavity in a coil end in the first embodiment.
Figure 9:
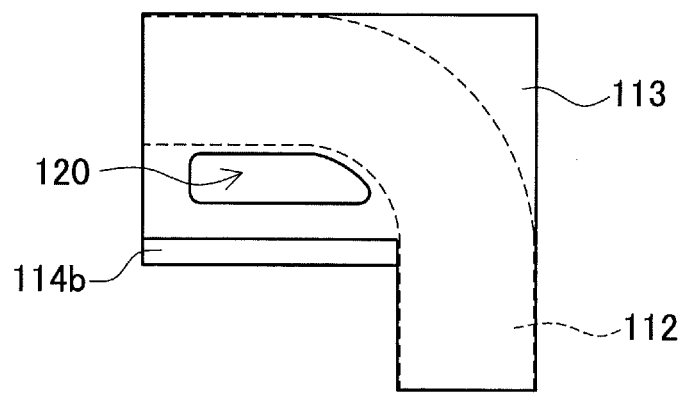
FIG. 9 is a model having a larger lower thickness in a comparative example.
Figure 10:
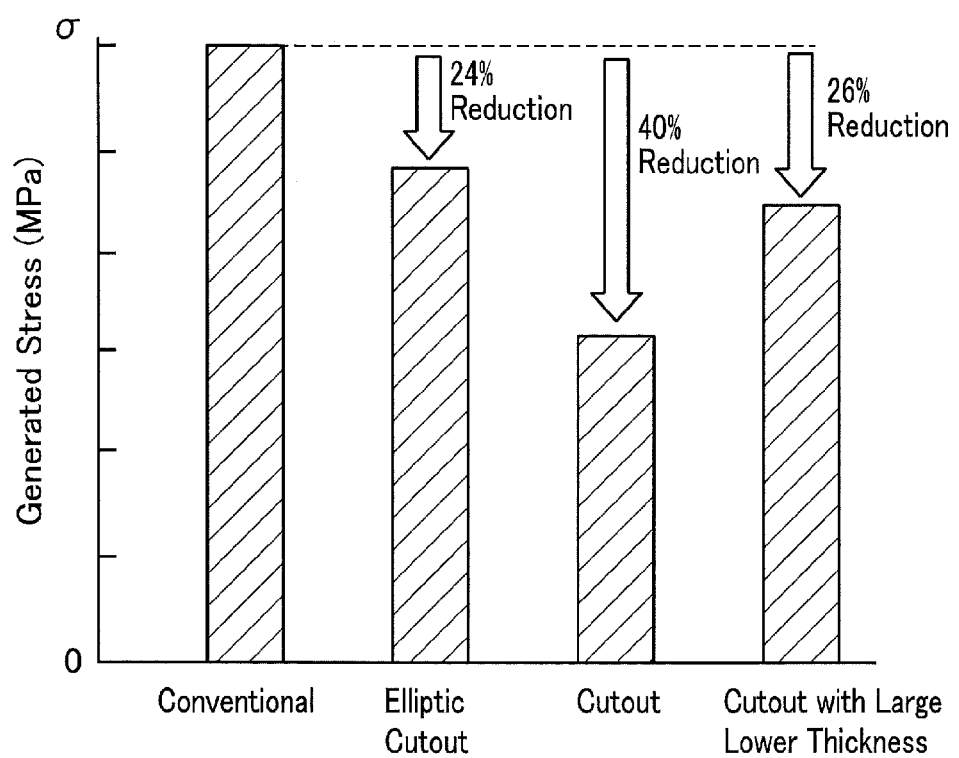
FIG. 10 is a graph showing stress analysis results by comparison between the models shown in FIGS. 6 to 9.

FIG. 6 shows a model of a stator formed with no cavity in a conventional art, corresponding to the part B in FIG. 3. FIG. 7 shows a model formed with an elliptic cutout, corresponding to the part B in FIG. 3. FIG. 8 shows a model formed with a cavity in a coil end, corresponding to the part B in FIG. 3. FIG. 9 shows a model formed to have a large lower thickness, corresponding to the part B in FIG. 3. FIG. 10 shows stress analysis results. Analysis models shown in FIGS. 6 to 9 were prepared and subjected to stress analysis on the coil ends of the stators 10. Results thereof are shown in FIG. 10. A vertical axis in a graph represents generated stress. An analysis result of the model shown in FIG. 6 is labeled by "Conventional". An analysis result of the model shown in FIG. 7 is labeled by "Elliptic Cutout". An analysis result of the model shown in FIG. 8 is labeled by "Cutout". An analysis result of the model shown in FIG. 9 is labeled by "Cutout with Large Lower Thickness".

The stress analysis results reveal that the model formed with the cavity 120 as shown in FIG. 8 achieves a highest stress reduction effect, and this effect is lower in turn in the model including a thick portion under the cavity 120 as shown in FIG. 9 and the model provided with the elliptic cavity 120. Specifically, the results in FIG. 10 reveal that a lesser amount of resin forming the resin molded part 113 is more effective in reducing stress and further show that a thinner thickness in an axial direction of the stator 10 can provide a better result. Consequently, the first embodiment uses the insulator 114 designed to have the support walls 114c.

The stator 10 of the first embodiment can also provide the advantage of reducing the amount of resin to be used for the resin molded part 113. Since the cavity 120 is provided in each coil end portion of the stator segment unit 110, the amount of resin to form the resin molded part 113 can be simply reduced. This reduced amount of resin for the resin molded part 113 enables reduction in weight of the stator 10. Further, the reduced amount of resin to be used can lead to a cost reduction.

Moreover, the stator 10 of the first embodiment provided with the cavity 120 in the resin molded part 113 can achieve a cooling effect. The motor using the stator 10 is mounted near an engine and hence in an environment where the stator 10 always contacts coolant. Accordingly, the stator 10 can have a surface area increased by the cavities 120 formed in the resin molded part 113 and hence have an increased contact area with the coolant, thereby enhancing the cooling efficient. Due to resistance heating from the coil 112 during use of the stator 10, there may be caused deterioration in insulating performance of the resin molded part 113, insulator 114, and others, degradation in energizing performance of the coil 112, and other defects. Cooling is thus necessary. Therefore improved cooling efficient of the stator 10 can contribute to an increase in performance of the motor and a longer life of the motor.

It is to be noted that the applicants performed various stress analyses of the stator 10 other than the above analyses. From their results, it was found that the stress reduction effect could be more enhanced by, in addition to the formation of the cavities 120 of the invention, a configuration that the corners of the teeth part 111a of the core piece 111 of the stator segment unit 110 were rounded off or a combination with a technique of providing a pin or pins on the end face sides of the teeth part 111a in order to prevent shrinkage of the resin molded part 113. Although depending on the design concept of the stator 10, the present invention may be combined with other configurations to provide high stress reduction effects.

A second embodiment of the invention will be explained below.

Second Embodiment

Figure 11:
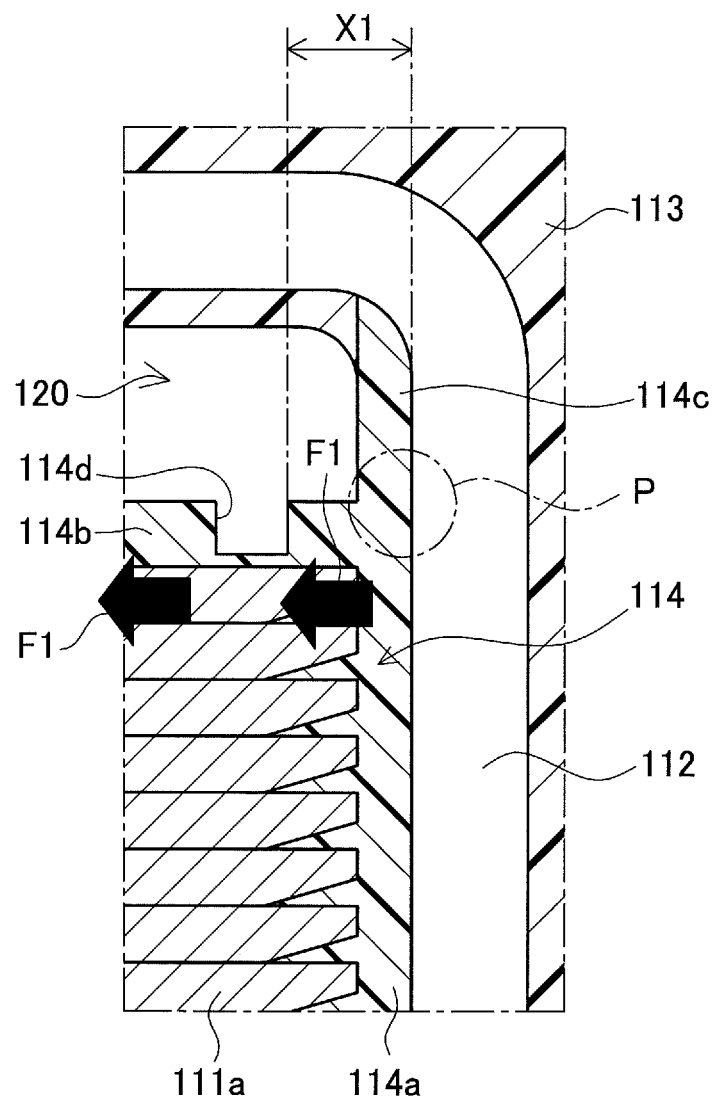
FIG. 11 is a schematic cross-sectional view of a stator core in a second embodiment.

The second embodiment has a configuration substantially the same as that of the first embodiment excepting the shape of an insulator 114. The following explanation is given to that difference. FIG. 11 is a schematic cross-sectional view of a stator core of the second embodiment. The insulator 114 of the second embodiment differs from the insulator 114 of the first embodiment in that a breakable groove 114d corresponding to a breakable portion is provided in the end-face wall 114b. This breakable groove 114d is provided to extend from an inner periphery side to an outer periphery side of the stator segment unit 110, that is, in parallel to the cavity 120.

Although only one side is illustrated in FIG. 11, the stator segment unit 110 is provided with the breakable grooves 114d at two portions in each end face, i.e., four portions in total. In other words, the breakable grooves 114d are formed at two portion s of each end-face wall 114b. These breakable grooves 114d are provided near both side end portions of each end-face wall 114b at corners of the insulator 114. For the need to provide an insulating creepage distance between the coil 112 and the teeth part 111a, a predetermined distance X1 is ensured from an end of the end-face wall 114b. That is, a rib having a width corresponding to the distance X1 is provided to extend from an end face of the side wall 114a.

The stator 10 of the second embodiment configured as above can provide the operations and advantageous effects explained below. Since the insulator 114 is positively broken off at the breakable grooves 114d, the stress generated in the insulator 114 can be relaxed. In the stator 10 of the second embodiment, the insulator 114 is provided with the breakable grooves 114d having low strength to be breakable, and the breakable grooves 114d are formed on the end face side of and in a radial direction of the stator segment unit 110. Accordingly, if the shrinkage force F1 is generated due to heat in a usage environment during use of the stator 10, the breakable grooves 114d are broken or split. This is because the end-face walls 114b of the insulator 114 are designed so that portions defining the breakable grooves 114d are thinnest and easy to break.

The breakable grooves 114d may be provided as breakable lines like perforation instead of the groove shape shown in the second embodiment. In other words, the insulator 114 has only to be configured so that the breakable grooves 114d are positively broken when the shrinkage force F1 is generated in the end-face walls 114b. At that time, if the ribs each having the width corresponding to the distance X1 are left in the side walls 114a, the insulating creepage distance between the coil 112 and the core piece 111 can be kept even when a portion corresponding to the breakable groove 114d is broken. Since such breakable grooves 114d are formed in the insulator 114, the grooves 114d are positively broken by the generation of the shrinkage force F1, thereby blocking the transmission of the shrinkage force F1. In other words, the force is divided into a right side and a left side of each breakable groove 114d in FIG. 11. Consequently, the concentrated stress is less likely to accumulate in the stress concentration area P. Accordingly, it is possible to prevent the generation of cracks which may cause short circuits between the teeth part 111a and the coil 112.

Each breakable groove 114d formed in the insulator 114 has a shape parallel to the cavities 120 and therefore can be made by mold release when the insulator 114 is made by insert molding. Specifically, the grooves 114d can be formed by simply changing a molding die for the insulator 114, so that measures against stress can be realized without increasing cost.

A third embodiment of the invention will be explained below.

Third Embodiment

Figure 12:
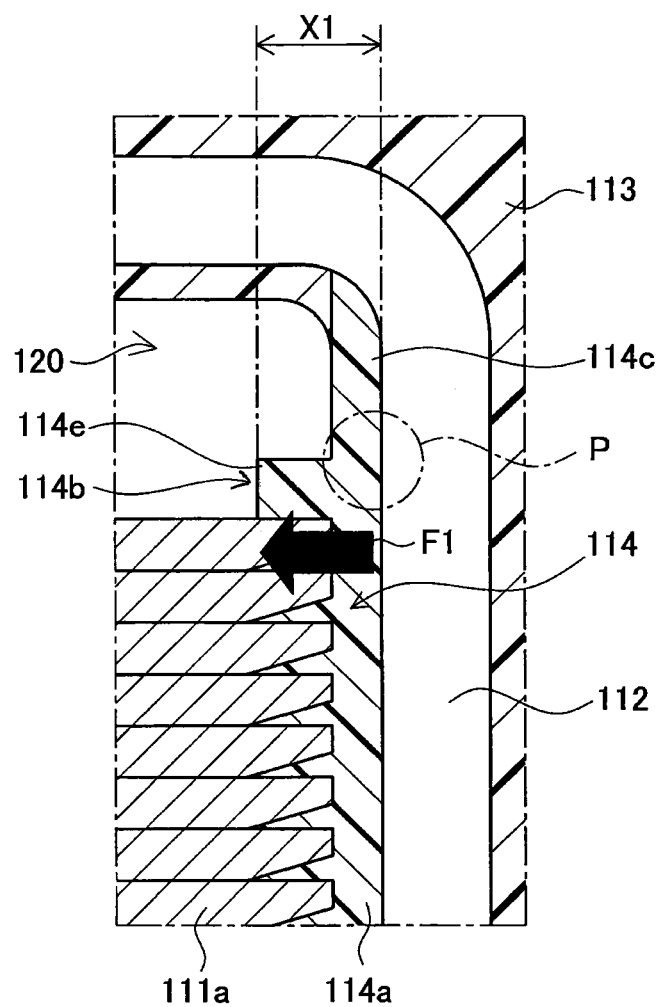
FIG. 12 is a schematic cross-sectional view of a stator core in a third embodiment.

The third embodiment has a configuration substantially the same as that of the first embodiment excepting a slight difference in the shape of the insulator 114. The following explanation is given to that difference. FIG. 12 is a schematic cross-sectional view of a stator of the third embodiment. The insulator 114 of the second embodiment differs from the insulator 114 of the first embodiment in the shape of the end-face walls 114b. Each end-face wall 114b is formed with only a width corresponding to a distance X1. Specifically, the insulator 114 is provided with a rib portion 114e having a width corresponding to the distance X1 and extending from and along an end of the side wall 114a. Other corners of the insulator 114 are similarly designed so that the end-face walls 114b are shaped in two separate forms. The distance X1 is set to such an extent as to ensure an insulating creepage distance between the coil 112 and the teeth part 111a.

The stator 10 of the third embodiment configured as above can provide the following operations and advantageous effects. Firstly, the end-face walls 114b of the insulator 114 do not cover all over the end faces of the teeth part 111a, i.e., the end-face walls 114b are discontinuously formed, so that the force generated in a direction of shrinkage force F1 can be restrained. The advantageous effects are similar to those in the second embodiment in which the end-face walls 114b are broken at the breakable grooves 114d. The second embodiment and the third embodiment differ from each other in whether the end-face walls are originally in a broken state or the end-face walls are broken during use.

A fourth embodiment of the invention will be explained below.

Fourth Embodiment

Figure 13:
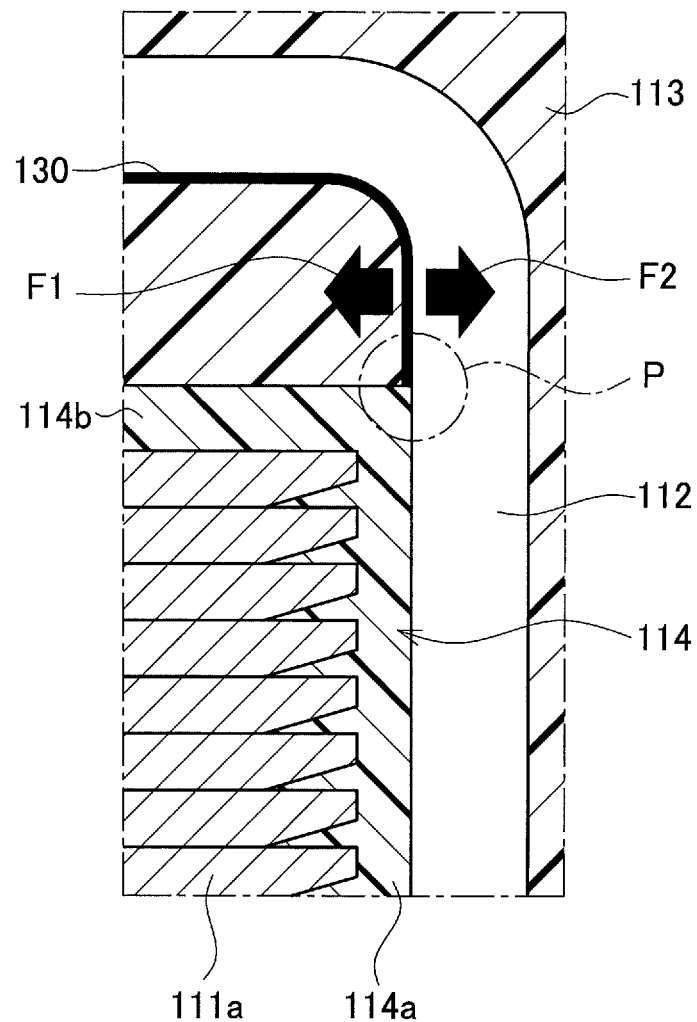
FIG. 13 is a schematic cross-sectional view of a stator core in a fourth embodiment.

The fourth embodiment has a configuration substantially the same as that of the first embodiment excepting a slight difference in a method of manufacturing the stator 10. The following explanation is given to that difference. FIG. 13 is a cross-sectional view of a stator core of the fourth embodiment. The stator 10 of the fourth embodiment is provided with a primer material 130 on the inner circumferential side of the coil 112 instead of providing the cavities 120 of the first embodiment.

This primer material 130 is applied to the inner circumferential surface of the coil 112 after the coil 112 is wound. The primer material 130 is preferably selected from high-heat-resistant materials, and herein is an epoxy adhesive. After the primer material 130 is applied to the inner circumferential surface of the coil 112, the coil 112 is mounted on the teeth part 111a of the core piece 111. This assembly is then subjected to insert-molding. The core piece 111 is formed with the insulator 114 in advance.

Thereafter, the resin molded part 113 is formed in such a process as explained in the first embodiment. Accordingly, the primer material 130 can enhance adhesion strength between the coil 112 and the resin molded part 113 present inside the coil 112. Although the first embodiment describes that the molding die needs to have the protrusions to form the cavities 120, such a protrusion is not needed in a molding die used in the fourth embodiment formed with no cavity 120. Alternatively, the primer material 130 may be applied after the coil 112 is mounted on the teeth part 111a.

The stator 10 of the fourth embodiment configured and manufactured as above can provide the following operations and advantageous effects. Firstly, it is possible to reduce the stress caused due to the heat generated in the stator 10 in a usage environment. The method of manufacturing the stator 10 in the fourth embodiment is achieved by winding the flat conductor D to form the coil 112, mounting the coil 112 on the core piece 111 including the teeth part 111a, and forming the resin molded part 113 to cover, with resin, the coil end portions of the coil 112 mounted on the core piece 111. In this method, the primer material 130 is applied to the inner circumferential surface of the coil end portions of the coil 112, this coil 112 coated with the primer material 130 is mounted on the teeth part 111a, and then the resin molded part 113 is formed.

Since the primer material 130 is provided on the inner circumferential surface of the coil 112, a reaction force F2 can be generated against the shrinkage force F1 generated as shown in FIG. 13. In the resin molded part 113, the heat shrinkage has an influence on a boundary between the coil 112 and the resin molded part 113. Specifically, when the resin molded part 113 is peeled from the coil 112, stress is more likely to accumulate in the stress concentration area P.

Accordingly, when the primer material 130 is provided to prevent peeling of the resin molded part 113 from the coil 112, the reaction force F2 is generated by adhesive force of the primer material 130 and elastic force of the coil 112, so that the generated shrinkage force F1 consequently acts in a direction to avoid the stress concentration in the stress concentration area P. This makes it possible to restrain the concentrated stress from accumulating in the resin molded part 113 or the insulator 114 of the stator 10 and contribute to lengthen the life of the stator 10.

To prevent the occurrence of peeling between the coil 112 and the resin molded part 113, besides the use of the primer material 130, it is conceivable to make the resin molded part 113 and the insulator 114 of a material having a good adhesion property with an insulating coating material of the coil 112 so that the insulating coating material covering the coil 112 and the resin forming the resin molded part 113 and the insulator 114 are less peeled from each other. Even when the materials of the resin molded part 113 and the insulator 114 have a good adhesion property with the insulating coating material covering the coil 112, the same effect as the application of the primer material 130 can be obtained. This method needs no step of applying the primer material 130 can thus contribute to a cost reduction of the stator 10. However, this method narrows the range of options for the resin to form the resin molded part 113 and the insulator 114. It is therefore preferable to select the resin in consideration of insulating performance and heat resistance demanded for resin.

A fifth embodiment of the invention will be explained below.

Fifth Embodiment

Figure 14:
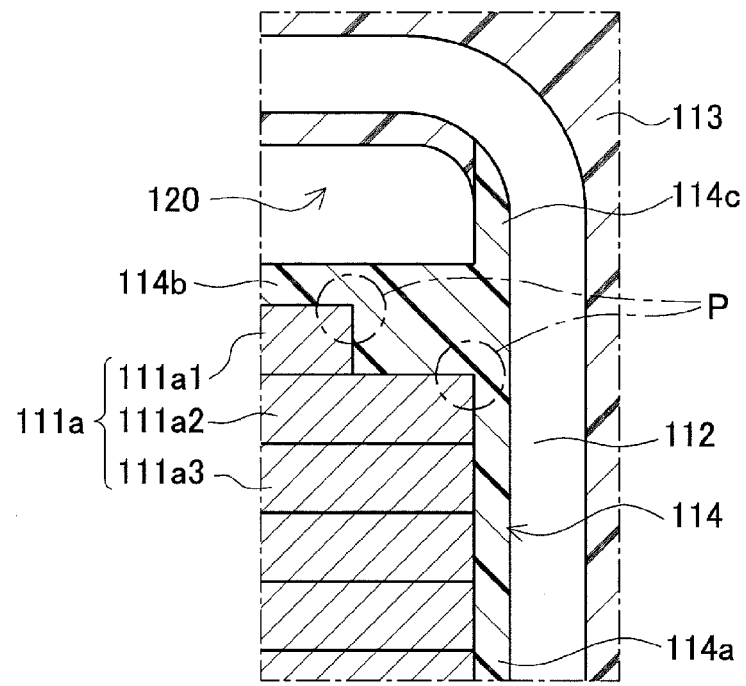
FIG. 14 is a schematic cross-sectional view of a stator core in a fifth embodiment.

The fifth embodiment has a configuration substantially the same as that of the first embodiment excepting a slight difference in the shape of the teeth part 111a. The following explanation is given to that difference. FIG. 14 is a schematic cross-sectional view of a stator of the fifth embodiment. The core piece 111 of the fifth embodiment is designed such that the teeth part 111a has, at each coil end portion, a shorter width in a circumferential direction of the core piece 111. Specifically, the width of a first electromagnetic-steel-sheet teeth part 111a1 located in an end face of the core piece 111 is designed to be narrower than those of a second electromagnetic-steel-sheet teeth part 111a2 and a third electromagnetic-steel-sheet teeth part 111a3 as shown in FIG. 14.

With the above configuration of the fifth embodiment, the stator segment unit 110 can relax stress concentration occurring in a stress concentration area P. Because of the shorter width of the first electromagnetic-steel-sheet teeth part 111a1, the corners of the insulator 114 formed around the teeth part 111a can be made thicker. Furthermore, as shown in FIG. 14, each corner of the teeth part 111a is formed with two shoulders in the first electromagnetic-steel-sheet teeth part 111a1 and the second electromagnetic-steel-sheet teeth part 111a2, so that stress concentration areas P of the stress caused by heat influence in a usage environment are dispersed.

A sixth embodiment of the invention will be explained below.

Sixth Embodiment

Figure 15:
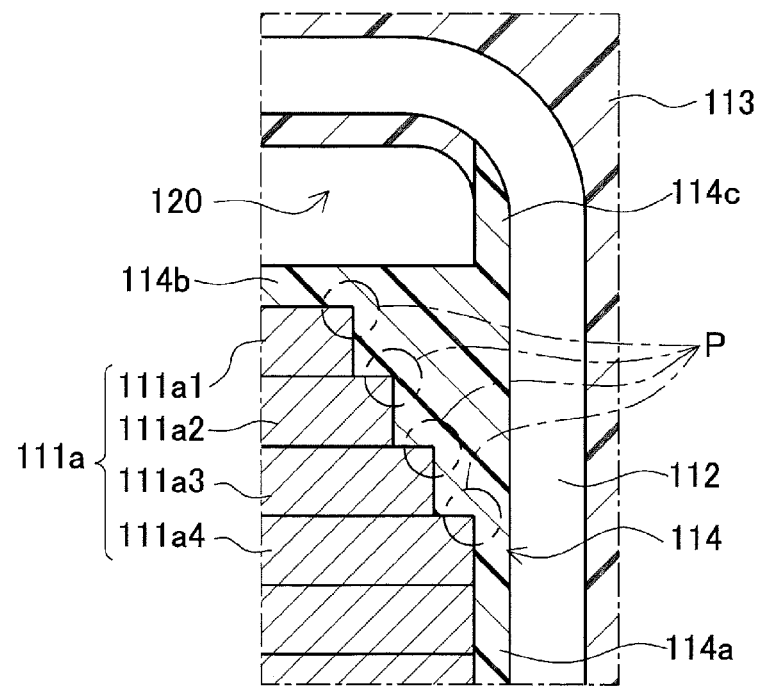
FIG. 15 is a schematic cross-sectional view of a stator core in a sixth embodiment.

The sixth embodiment has a configuration substantially the same as that of the first embodiment excepting a slight difference in the shape of the teeth part 111a. the following explanation is given to that difference. FIG. 15 is a schematic cross-sectional view of a stator of the sixth embodiment. In a core piece 111 of the sixth embodiment, the width of the teeth part 111a in a circumferential direction of the core piece is narrower in a stepped manner, at each coil end portion. To be more specific, as shown in FIG. 15, a teeth width of a first electromagnetic-steel-sheet teeth part 111a1 located in an end face of the core piece 111 is narrower than that of a second electromagnetic-steel-sheet teeth part 111a2, the width of this teeth part 111a2 is narrower than that of a third electromagnetic-steel-sheet teeth part 111a3, and the width of this teeth part 111a3 is narrower than that of a fourth electromagnetic-steel-sheet teeth part 111a4.

With the above configuration of the sixth embodiment, the stator segment unit 110 can relax stress concentration occurring in a stress concentration area P. In the configuration of the sixth embodiment, each corner of the teeth part 111a is formed in a more stepped shape than that in the fifth embodiment and thus the stress concentration areas P are dispersed. Specifically, the teeth part 111a of the sixth embodiment has the corners each formed stepwise with a larger number of shoulders than in the fifth embodiment, so that the stress concentration areas P in the sixth embodiment are more dispersed.

Figure 16:
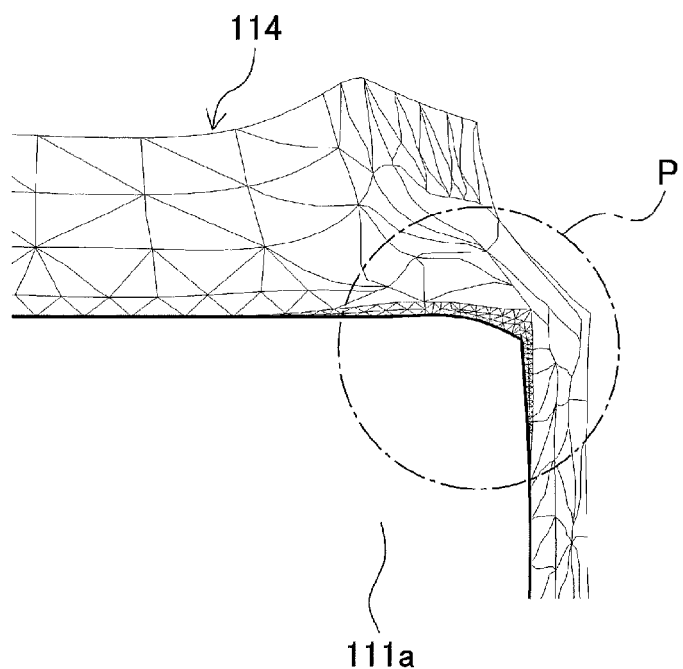
FIG. 16 is a diagram showing an analysis result of strain or warp of an insulator in a conventional art.
Figure 17:
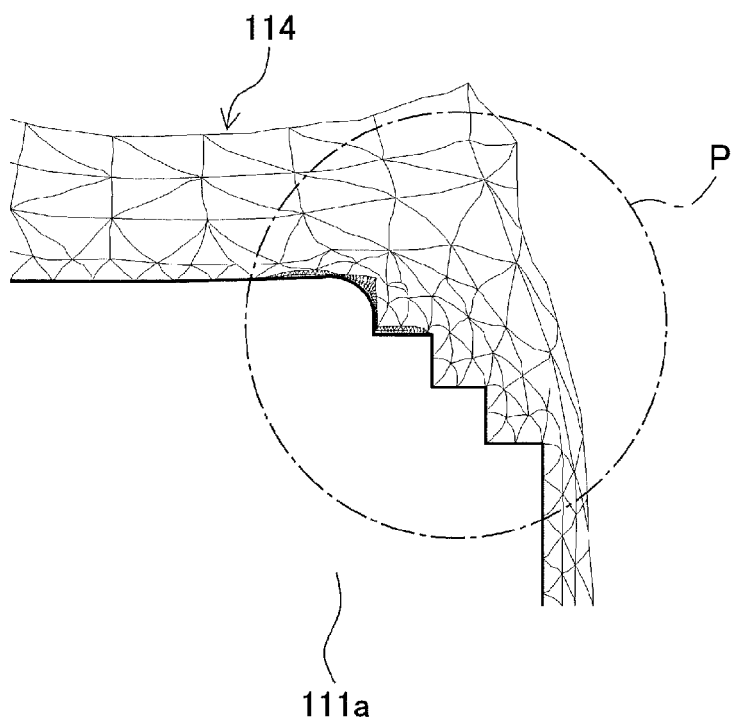
FIG. 17 is a diagram showing an analysis result of strain or warp of an insulator in the sixth embodiment.

FIG. 16 shows an analysis result of strain of the insulator in a conventional art. FIG. 17 shows an analysis result of strain of the insulator of the sixth embodiment. The strain of the insulator 114 is schematically illustrated, in which larger deformation represents larger strain. It is therefore found from comparison between FIGS. 16 and 17 that the strain generated in the insulator 114 in FIG. 17 is relaxed as compared with that in FIG. 16. In other words, these stress analysis results reveal that the corners of the teeth part 111a formed in a stepped shape can reduce the accumulation of stress generated in the stress concentration area P.

Figure 18:
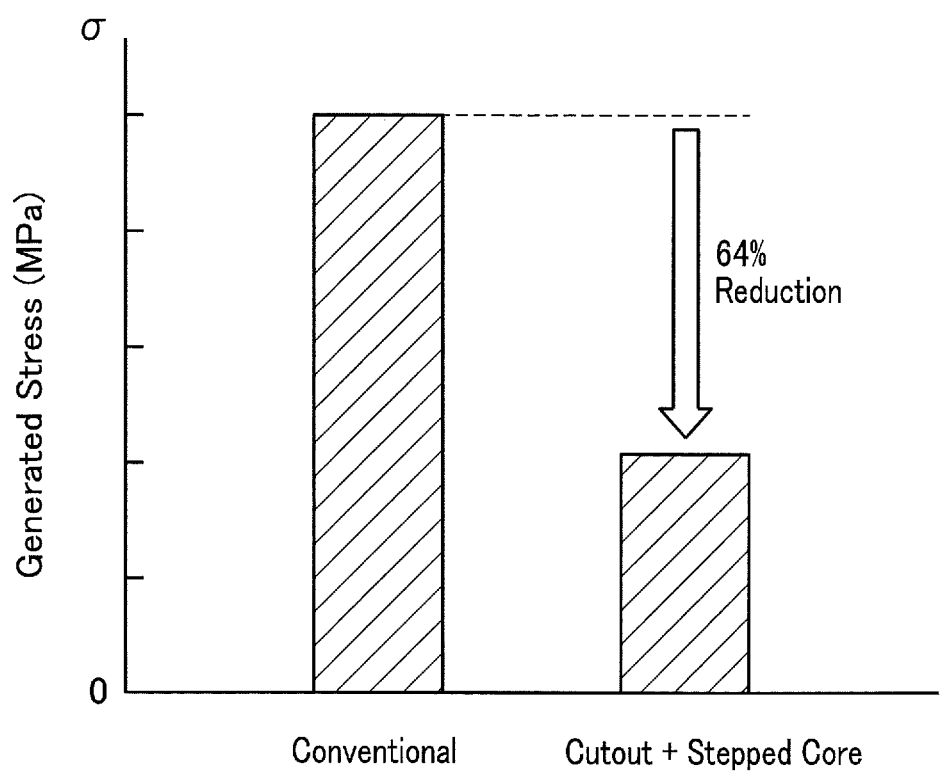
FIG. 18 is a graph showing stress analysis results by comparison in the sixth embodiment.

FIG. 18 is a graph showing stress analysis results by comparison. A vertical axis represents generated stress. An analysis result of the model shown in FIG. 6, as in FIG. 10, is labeled by "Conventional" for comparison. An analysis result of the model shown in FIG. 15 is labeled by "Cutout+Stepped Core". When the corners of the teeth part 111a are formed in the stepped shape as shown in FIG. 15 and the cavities 120 are provided in the sixth embodiment, the generation of stress can be reduced as shown in FIG. 18. It is found that this can provide higher effects even as compared with the stator segment unit 110 of the first embodiment shown in FIGS. 8 and 10.

In the stators 10 of the fifth and sixth embodiments, each corner of the teeth part 111a is designed to disperse stress concentration by setting different widths of the electromagnetic-steel-sheet teeth parts. That is, the first electromagnetic-steel-sheet teeth part 111a1 is designed with a narrower width than that of the second electromagnetic-steel-sheet teeth part 111a2. Accordingly, this difference in width directly influences only the insulator 114. However, since the insulator 114 and the resin molded part 113 are made of resin, the adhesion strength is high, and hence the difference in width indirectly influences the resin molded part 113. Consequently, the relaxation of stress generated in the resin molded part 113 can be realized by the cavities 120 and the configuration of teeth part 111a.

A seventh embodiment of the invention will be explained below.

Seventh Embodiment

Figure 19:
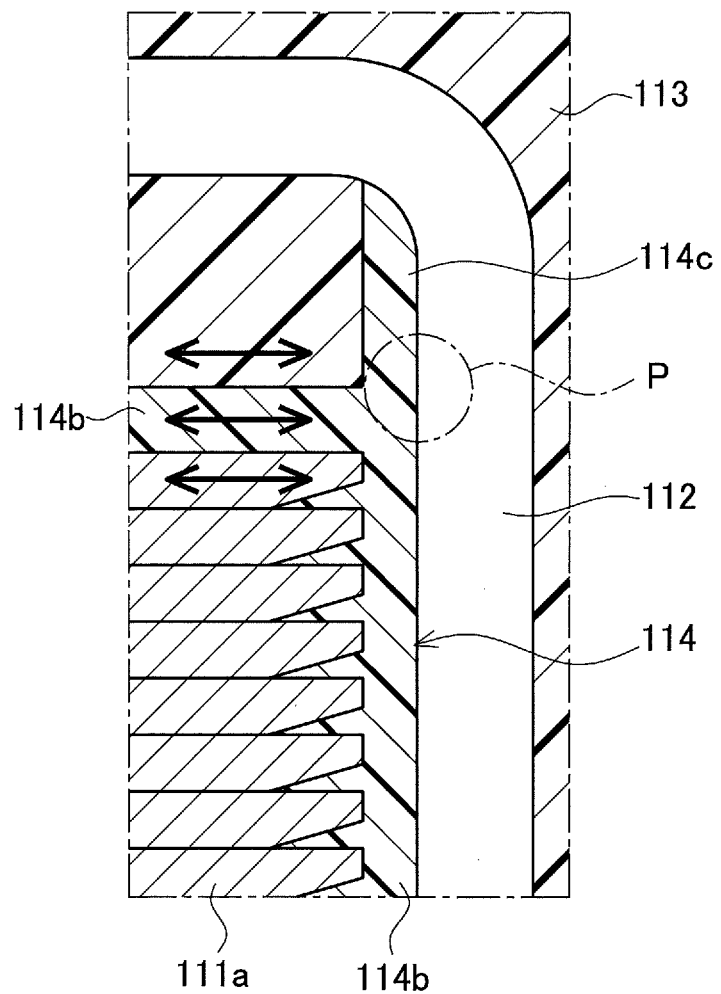
FIG. 19 is a schematic cross-sectional view of a stator core in a seventh embodiment.

The seventh embodiment has a configuration substantially the same as that of the first embodiment excepting slight differences in resin used as materials of the insulator 114 and resin molded part 113, configuration of the resin molded part 113, and so on. The following explanation is given to those differences. FIG. 19 is a schematic cross-sectional view of a stator of the seventh embodiment. A core piece 111 of the seventh embodiment, different from that of the first embodiment, is not formed with the cavities 120 in the resin molded part 130. Instead thereof, the resin used for the resin molded part 113 and the insulator 114 is adjusted to reduce a difference between the linear expansion coefficient of the teeth part 111a and the linear expansion coefficients of the resin molded part 113 and the insulator 114.

To be specific, the composition and orientation of filler to be mixed in the resin for the resin molded part 113 or the insulator 114 are adjusted. Alternatively, the linear expansion coefficients can be changed by adjusting the flow of resin to form the resin molded part 113 and the insulator 114. The filler to be mixed in the resin is a fibrous reinforcing material and mixed for the purpose of enhancing the strength of the insulator 114 and the strength of the resin molded part 113, and other purposes. Accordingly, as an amount of mixture of the filler is larger, the linear expansion coefficients of the resin molded part 113 and the insulator 114 are made smaller. Similarly, in the case where the fiber direction of the filler is aligned to the circumferential direction of the stator 10, the linear expansion coefficient in the circumferential direction of the stator 10 can be decreased.

Furthermore, the heat shrinkage rate also varies depending on the flowing direction of resin in the insert-molding of the resin molded part 113 and the insulator 114. Thus, when the position of a pouring gate is adjusted so as to direct a flow of resin for the resin molded part 113 and the insulator 114 in the circumferential direction of the stator 10, the linear expansion coefficients of the resin molded part 113 and the insulator 114 can be decreased. By using the above methods, the linear expansion coefficients of the resin molded part 113 and the insulator 114 are adjusted to become approximate to the linear expansion coefficient of the core piece 111. Accordingly, the stress generated in the resin molded part 113 and the insulator 114 can be relaxed. This can mitigate the stress accumulating in the stator 10 and keep insulation of the stator 10.

The present invention is described in the above embodiments but is not limited thereto. The invention may be embodied in other specific forms without departing from the essential characteristics thereof. For instance, the materials exemplified in the first to fourth embodiments may be changed within a scope of the purpose thereof. The configurations may also be changed within a scope of the purpose of the invention.

For the shape of the cavities 120 provided in the resin molded part 113, various patterns are conceivable. Accordingly, the shape of the cavities 120 may be changed to relax the stress concentration occurring in the resin molded part 113. Further, the primer material 130 shown in the fourth embodiment may be combined with other embodiments. For instance, even when the resin molded part 113 is provided with the cavities 120 as disclosed in the first embodiment, the primer material 130 may be applied to the inner circumferential surface of the coil 112. In this case, the reaction force F2 as shown in FIG. 13 is generated. Consequently, the stress concentration in the stress concentration area P can be more relaxed.

DESCRIPTION OF THE REFERENCE SIGNS

10 Stator
101 Bus bar holder
102 Outer ring
110 Split-stator unit
111 Core piece
111a Teeth part
112 Coil
112a Outside coil terminal end
112b Inside coil terminal end
113 Resin molded portion
114 Insulator
114a Side wall
114b End-face wall
114c Support wall
114d Breakable groove
120 Cavity
130 Primer material
D Flat conductor
F1 Shrinkage force
F2 Reaction force
P Stress concentration area
X1 Distance

The invention claimed is:

1. A stator including a coil formed by winding a conductor, a stator core provided with a teeth on which the coil is mounted, and a resin molded part covering a coil end portion of the coil mounted on the stator core with resin,
wherein an insulator is formed and provided by insert molding between the stator core and the coil, and
wherein the resin molded part includes a cavity formed through in a radial direction and fully enclosed in both circumferential and axial directions of the stator core, the cavity serving as a stress relaxing section between the coil and an end face of the stator core to relax stress generated in the resin molded part caused by heat influence in a usage environment, and
wherein the insulator includes an end face wall covering the end face of the stator core, the end face wall is provided with a breakable groove formed along the cavity to break the insulator.

2. The stator according to claim 1, wherein, the stator core consists of laminated electromagnetic steel sheets and one of the sheets located in the end face of the stator core has a teeth part having a width narrower than other sheets in a circumferential direction of the stator core.

3. The stator according to claim 2, wherein the insulator includes a pair of support walls supporting the coil, and the cavity is formed between the pair of support walls.

4. The stator according to claim 1, wherein the insulator includes a pair of support walls supporting the coil, and the cavity is formed between the pair of support walls.

5. A stator including a coil formed by winding a conductor, a stator core provided with teeth on which the coil is mounted, and a resin molded part covering a coil end portion of the coil mounted on the stator core with resin,
   wherein an insulator is formed and provided by insert molding between the stator core and the coil, and
   wherein the resin molded part includes a cavity formed through in a radial direction and fully enclosed in both circumferential and axial directions of the stator core, the cavity serving as a stress relaxing section between the coil and an end face of the stator core to relax stress generated in the resin molded part caused by heat influence in a usage environment, and
   wherein the insulator is formed with a rib on an end face side of the stator core, the rib extending from a side wall covering a side surface of the teeth and along the end face of the stator core.

6. The stator according to claim 5, wherein, the stator core consists of laminated electromagnetic steel sheets and one of the sheets located in the end face of the stator core has a teeth part of the teeth having a width narrower than other sheets in a circumferential direction of the stator core.

7. The stator according to claim 6, wherein the insulator includes a pair of support walls supporting the coil, and the cavity is formed between the pair of support walls.

8. The stator according to claim 5, wherein the insulator includes a pair of support walls supporting the coil, and the cavity is formed between the pair of support walls.

9. A stator including a coil formed by winding a conductor, a stator core provided with teeth on which the coil is mounted, and a resin molded part covering a coil end portion of the coil mounted on the stator core with resin,
   wherein an insulator is formed and provided by insert molding between the stator core and the coil, and
   wherein the resin molded part includes a cavity formed through in a radial direction and fully enclosed in both circumferential and axial directions of the stator core, the cavity serving as a stress relaxing section between the coil and an end face of the stator core to relax stress generated in the resin molded part caused by heat influence in a usage environment, and
   wherein the insulator includes a pair of support walls supporting the coil, and the cavity is formed between the pair of support walls.

* * * * *